United States Patent
Choksi

(10) Patent No.: US 7,509,137 B2
(45) Date of Patent: Mar. 24, 2009

(54) METHOD AND SYSTEM FOR ADDRESS TRANSLATION AND ALIASING TO EFFICIENTLY UTILIZE UFMI ADDRESS SPACE

(75) Inventor: Ojas Thakor Choksi, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 597 days.

(21) Appl. No.: 11/223,652

(22) Filed: Sep. 8, 2005

(65) Prior Publication Data

US 2006/0063542 A1    Mar. 23, 2006

Related U.S. Application Data

(60) Provisional application No. 60/608,137, filed on Sep. 9, 2004.

(51) Int. Cl.
*H04B 7/00* (2006.01)
*H04Q 7/518* (2006.01)

(52) U.S. Cl. .................. 455/517; 455/507; 455/518; 455/521; 455/552.1; 370/400; 370/466

(58) Field of Classification Search .............. 455/426.1, 455/524, 450, 521, 507, 552.1, 517–518, 455/520, 422.1, 560, 445, 527, 509; 370/401, 370/310, 400, 345, 347, 442, 466, 474
See application file for complete search history.

(56) References Cited

U.S. PATENT DOCUMENTS

| | | | | |
|---|---|---|---|---|
| 5,850,611 | A * | 12/1998 | Krebs | .......................... 455/518 |
| 5,987,331 | A * | 11/1999 | Grube et al. | ................. 455/509 |
| 6,421,329 | B1 | 7/2002 | Kikinis | |
| 6,519,239 | B1 | 2/2003 | Panchal et al. | |
| 6,781,963 | B2 | 8/2004 | Crockett et al. | |
| 6,904,285 | B2 * | 6/2005 | Drozt et al. | ................. 455/450 |
| 2003/0128693 | A1 * | 7/2003 | Segal | ......................... 370/352 |
| 2004/0190535 | A1 * | 9/2004 | Albal et al. | ................. 370/401 |
| 2005/0286542 | A1 * | 12/2005 | Shores et al. | ............... 370/401 |

OTHER PUBLICATIONS

Henning G. Schulzrinne and Jonathan D. Rosenberg, The Session Initiation Protocol: Providing Advanced Telephony Services Across the Internet, Bell Labs Technical Journal, Oct.-Dec. 1998, pp. 144-160.

White Paper: IP Convergence Based On SIP—Enhanced Person-To-Person Communications, Nokia, Forum Nokia, Jun. 21, 2004, pp. 1-21, Version 1.0.

(Continued)

*Primary Examiner*—Sujatha Sharma

(57) ABSTRACT

An address server comprising a UFMI server application adapted to allocate an inter-working UFMI to an iDEN subscriber unit and map the inter-working UFMI to an external subscriber address. The inter-working UFMI is associated with an iDEN network, and the external subscriber address is associated with an external network. The address server includes an iHLR, a data storage storing a pool of reusable iDEN UFMIs and mapped pairs of iDEN UFMIs to external subscribers. The mappings are stored on a per user, per fleet or per account basis. The data storage also stores a pool of global iDEN UFMIs. Use of the inter-working UFMIs facilitates dispatch communications between the iDEN subscriber unit and the external subscriber.

30 Claims, 6 Drawing Sheets

OTHER PUBLICATIONS

Kundan Singh and Henning Schulzrinne, Interworking Between SIP/SDP and H.323, IPTEL 2000, Dept. of Computer Science, Columbia University, New York, USA.

Tomas Robles, Ramiro Ortiz, and Joaquin Salvachua, Porting the Session Initiation Protocol to IPv6, Moving Toward an IPv6 Future, May-Jun. 2003, pp. 43-50, IEEE Computer Society.

Janet R. Dianda, Vijay K. Gurbani, and Mark H. Jones, Session Initiation Protocol Services Architecture, Bell Labs Technical Journal, Lucent Technologies Inc., 2002, pp. 3-23, Wiley Periodicals, Inc.

iDEN, Technical Overview, Motorola Inc., Network Solutions Sector, Aug. 8, 2000, 68P81095E55-E, USA.

International Search Report and Written Opinion, Aug. 19, 2008.

* cited by examiner

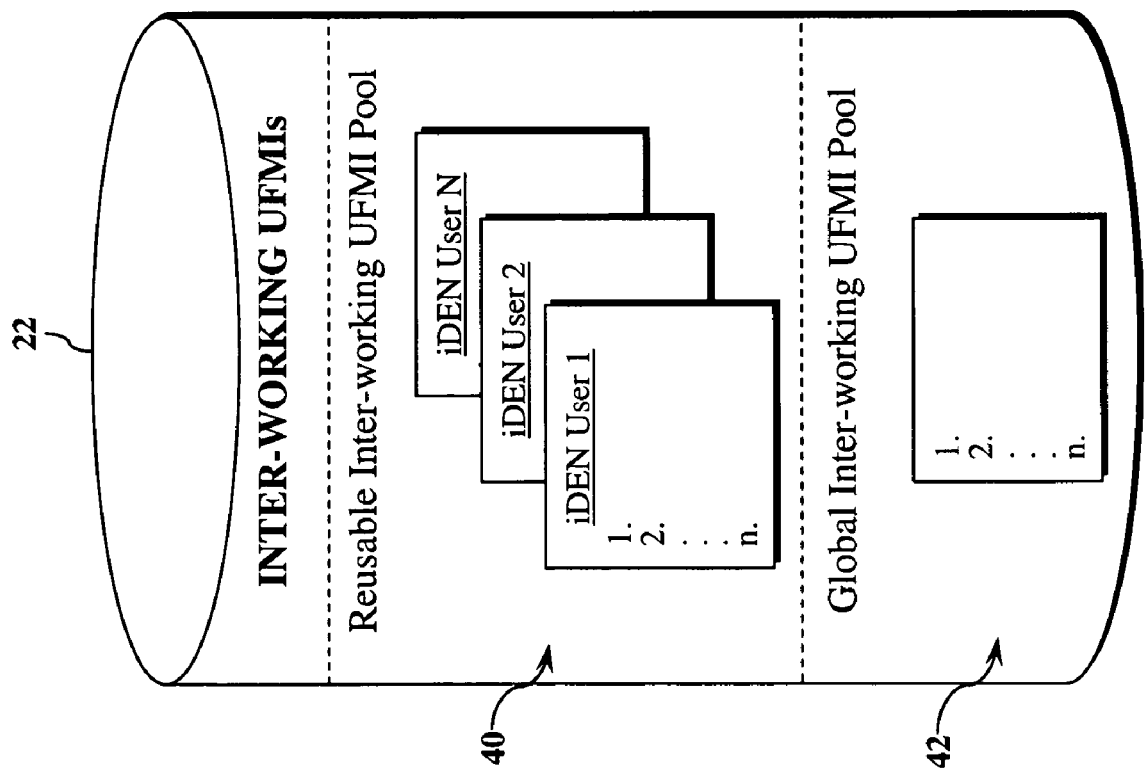

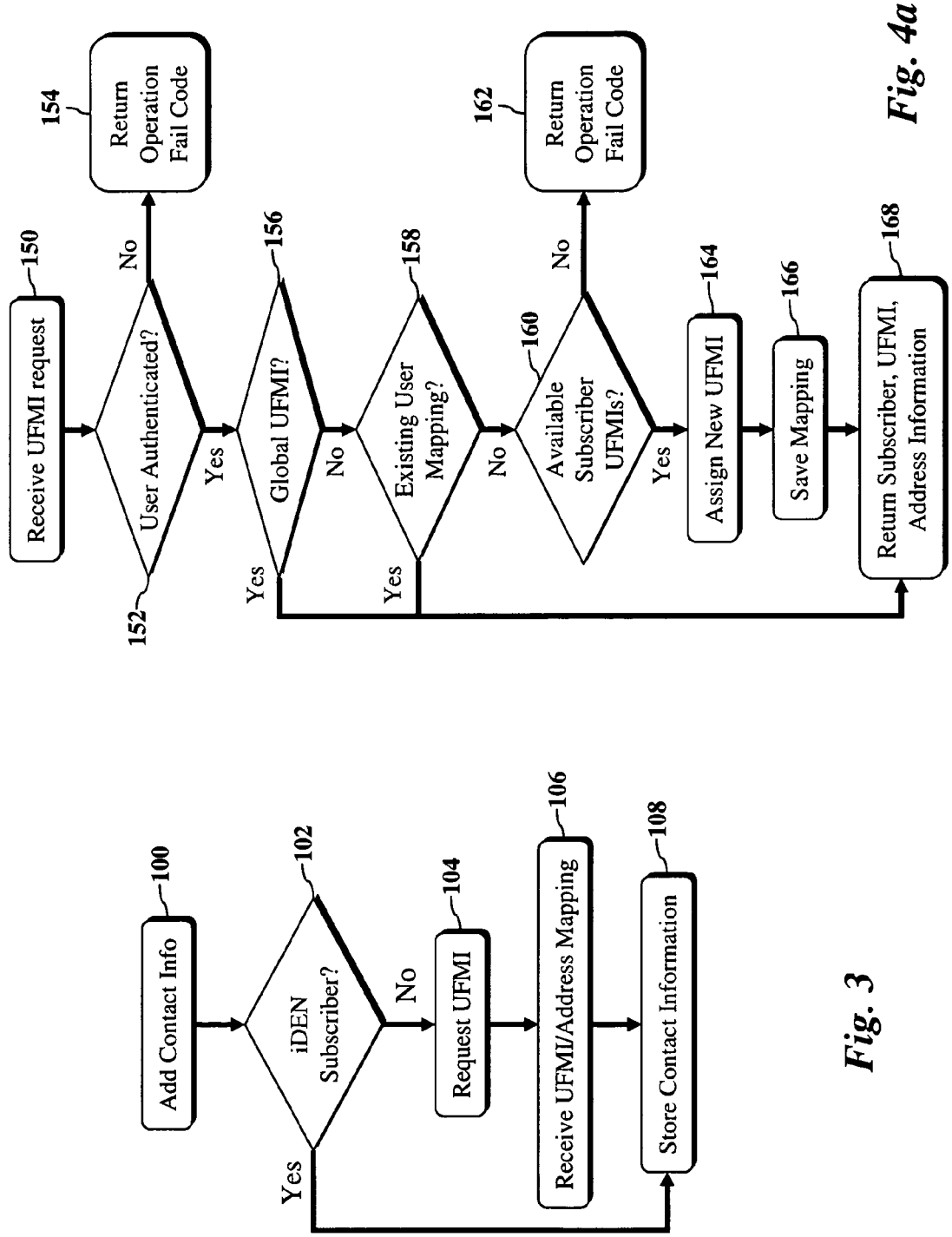

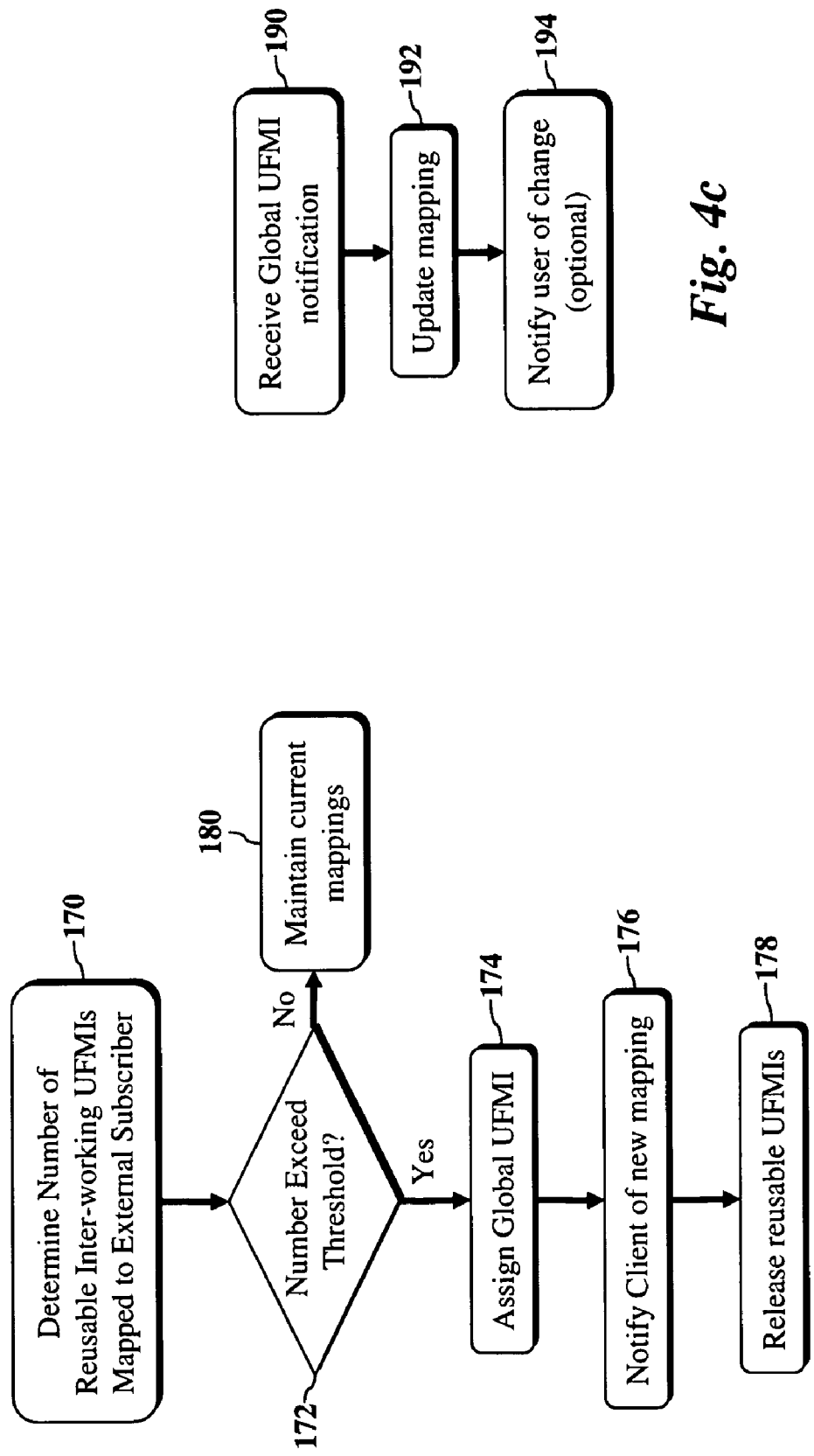

METHOD AND SYSTEM FOR ADDRESS TRANSLATION AND ALIASING TO EFFICIENTLY UTILIZE UFMI ADDRESS SPACE

CROSS REFERENCE TO RELATED APPLICATION

The present invention claims priority to U.S. Provisional Patent Application No. 60/608,137, filed Sep. 9, 2004, the disclosure of which is incorporated herein by reference.

FIELD OF THE INVENTION

The present invention relates generally to wireless communications systems and more particularly to systems and methods for efficiently utilizing address space in an Integrated Digitally Enhanced Network, such as the network trademarked by Motorola, Inc. as iDEN® and hereinafter referred to as iDEN.

BACKGROUND OF THE INVENTION

Wireless communications systems are operated worldwide by carriers who charge fees to subscribers for use of wireless services such as interconnect, short message service (SMS), packet data and push-to-talk (PTT). Each wireless communications system services subscribers within a geographic coverage area and operates using one or more wireless technologies such as code division multiple access (CDMA), global system for mobile communication (GSM), time division multiple access (TDMA) or Advanced Mobile Phone Service (AMPS).

PTT services (also known as a walkie-talkie or dispatch services) are currently offered by some wireless carriers, such as Nextel's Direct Connect® service, and new PTT services and technologies have been proposed. Generally, a PTT call provides near-instant, half-duplex communication between a PTT caller and a target group of PTT users. PTT calls are currently limited to calls between wireless users who utilize compatible PTT technologies and are subscribers on the same carrier network. For example, subscribers on a network operated by a first wireless carrier cannot currently engage in PTT calls with PTT subscribers on a network operated by a second wireless carrier.

Solutions have been proposed to connect two or more disparate PTT networks, but such solutions do not efficiently use the resources of each PTT network. For example, iDEN systems use a mobile station identifier for PTT communications known as an Urban Fleet Member Identifier (UFMI). Due to constraints of the iDEN system, there are a limited number of UFMIs available to be assigned, thus imposing scalability limitations when connecting the iDEN network to one or more external networks. Accordingly, a need exists for a PTT inter-working solution that efficiently utilizes iDEN's UFMI address space.

SUMMARY OF THE INVENTION

The present invention efficiently utilizes UFMI address space in inter-working environments. In one embodiment, an iDEN network includes an address server adapted to allocate an inter-working UFMI to an iDEN subscriber unit and map the inter-working UFMI to an external subscriber address on a second network. A dispatch call controller facilitates dispatch communications between the iDEN subscriber unit and the external subscriber. A gateway facilitates dispatch communications between the iDEN network and the external network.

In a second embodiment, a method for facilitating dispatch communications between a first subscriber on a first network and a second subscriber on a second network, includes providing the first subscriber with a reusable pool of inter-working UFMIs, and mapping an address of the second subscriber on the second dispatch network to a select one of the UFMIs. The selected UFMI defines an address of the second subscriber on the first network.

In a third embodiment, an application in a mobile device includes logic for performing the steps of receiving a request to store user information associated with an external subscriber unit, and transmitting a request for an inter-working UFMI to an address server, the request including a mobile device identifier and the user information. A UFMI to external address mapping is received and stored on the mobile device.

BRIEF DESCRIPTION OF THE DRAWINGS

FIGS. 1a & 1b illustrate an embodiment of an iDEN network in accordance with the present invention;

FIG. 3 is a flow diagram illustrating an embodiment of contacts application logic;

FIG. 4a is a flow diagram illustrating an embodiment of address server logic;

FIGS. 4b and 4c are flow diagrams illustrating an embodiment of a process for implementing global UFMIs for an address server and subscriber unit, respectively;

DETAILED DESCRIPTION OF EXEMPLARY EMBODIMENTS

Figure 1A:
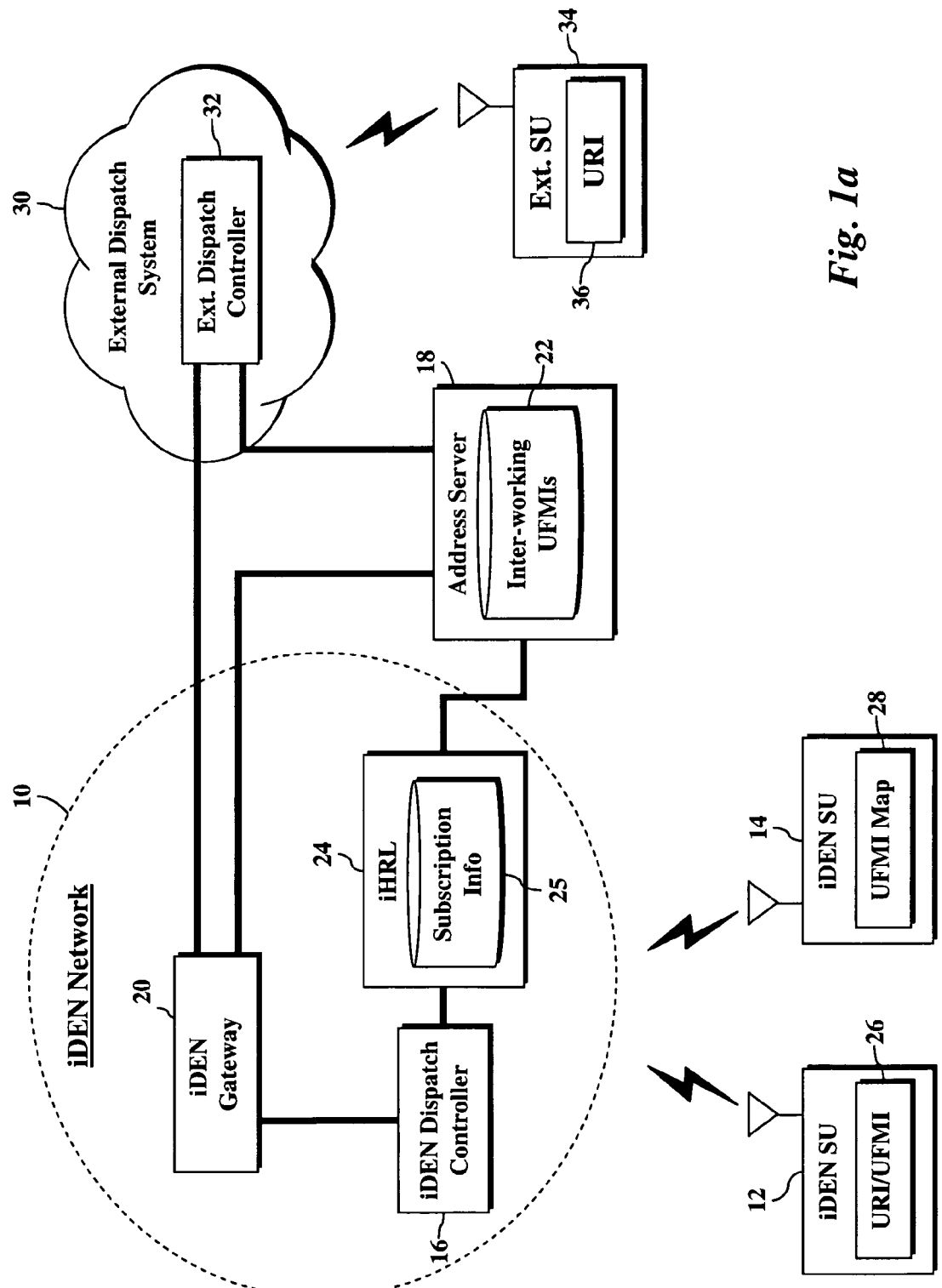

Referring to FIG. 1, an iDEN network 10 provides dispatch services, via wireless and/or wireline communications, to a plurality of subscriber units, such as iDEN subscriber unit (iSU) 12 and iDEN subscriber unit (iSU) 14. The iDEN network 10 includes an iDEN dispatch controller 16, an iDEN gateway 20 and an iDEN Home Location Register (iHLR) 24 storing subscriber information 25. The iDEN gateway 20 facilitates dispatch communications between subscribers on the iDEN network 10 and at least one other network, such as external dispatch network 30. In one embodiment, the iDEN Gateway 20 is adapted to receive iDEN dispatch communications, translate the communications to an open protocol such as SIP, and forward to external dispatch systems. The iDEN Gateway 20 is also adapted to receive dispatch communications from an external network, convert the dispatch communications to an iDEN format and forward to the appropriate iDEN subscriber. The external dispatch network 30 includes a dispatch controller 32 facilitating dispatch communications with a plurality of subscriber units accessing the dispatch system 30, such as external subscriber unit (eSU) 34. The dispatch network 30 may operate using any dispatch technology including iDEN, Qchat and push-to-talk over cellular (PoC).

Within the iDEN network 10, the iDEN dispatch controller 16 facilitates dispatch communications among iDEN subscribers, such as iSU 12 and iSU 14. Each iDEN subscriber unit has a corresponding UFMI address assigned by the iDEN network 10 for use as a subscriber identifier for dispatch communications. Each UFMI provides a full path name for a subscriber unit and includes an urban identifier, a fleet identifier and a mobile identifier (e.g., 164*100*94). Similarly, to facilitate communications between the iSU 12 and the eSU 34, the eSU 34 is assigned an inter-working UFMI on the iDEN network 10.

An iDEN address server 18 manages a pool of inter-working UFMIs 22. In the exemplary embodiment, the iDEN address server 18 is external to the iDEN network 10, but it will be appreciated that in alternate embodiments, the iDEN address server 18 may be included within the iDEN network 10, the external dispatch system 30 or another network. The inter-working UFMIs 22 include a subset of the available UFMIs on the iDEN network 10 that are identified for use in inter-working communications. As illustrated in FIG. 1b, the pool of available UFMIs includes a reusable inter-working UFMI pool 40 and a global inter-working UFMI pool 42. Each iDEN subscriber is allocated a number of reusable inter-working UFMIs 40. The number of allocated UFMIs may vary depending on the subscriber's service plan, pricing plan or other criteria. For example, iSU 12 and iSU 14 may be allocated UFMIs 1-100 and 101-200 respectively. Overlapping pools of UFMI's may also be used in which the same range of available UFMIs (e.g., 1-200) may be allocated to both iSU 12 and iSU 14, with each subscriber unit having use of 100 UFMIs. When the number of UFMIs allocated to an external subscriber exceeds a predetermined threshold number, the address server allocates a single global UFMI 42 for the external subscriber and releases the reusable UFMI's 40 mapped to the external subscriber.

In one embodiment, the mapping of the UFMIs is user driven, allowing each subscriber unit to map the allocated UFMI address space to select external subscribers. Each iDEN subscriber unit 12 and 14, maintains its own mapping data in its local memory, 26 and 28, respectively. For example, to facilitate communications between the iSU 12 and the eSU 34, the address server 18 establishes a mapping between a device address of the eSU 34, such as uniform resource identifier (URI) 36, and one of the inter-working UFMIs 22, and transmits the mapping to the iSU 12, which stores the mapping locally in memory 26. The address server 18 stores the mapping in the database 22 and may also transmit the mapping to the external dispatch controller 32, if the external dispatch controller 32 is adapted to support the iDEN network's UFMI address mapping features described herein.

Figure 2:
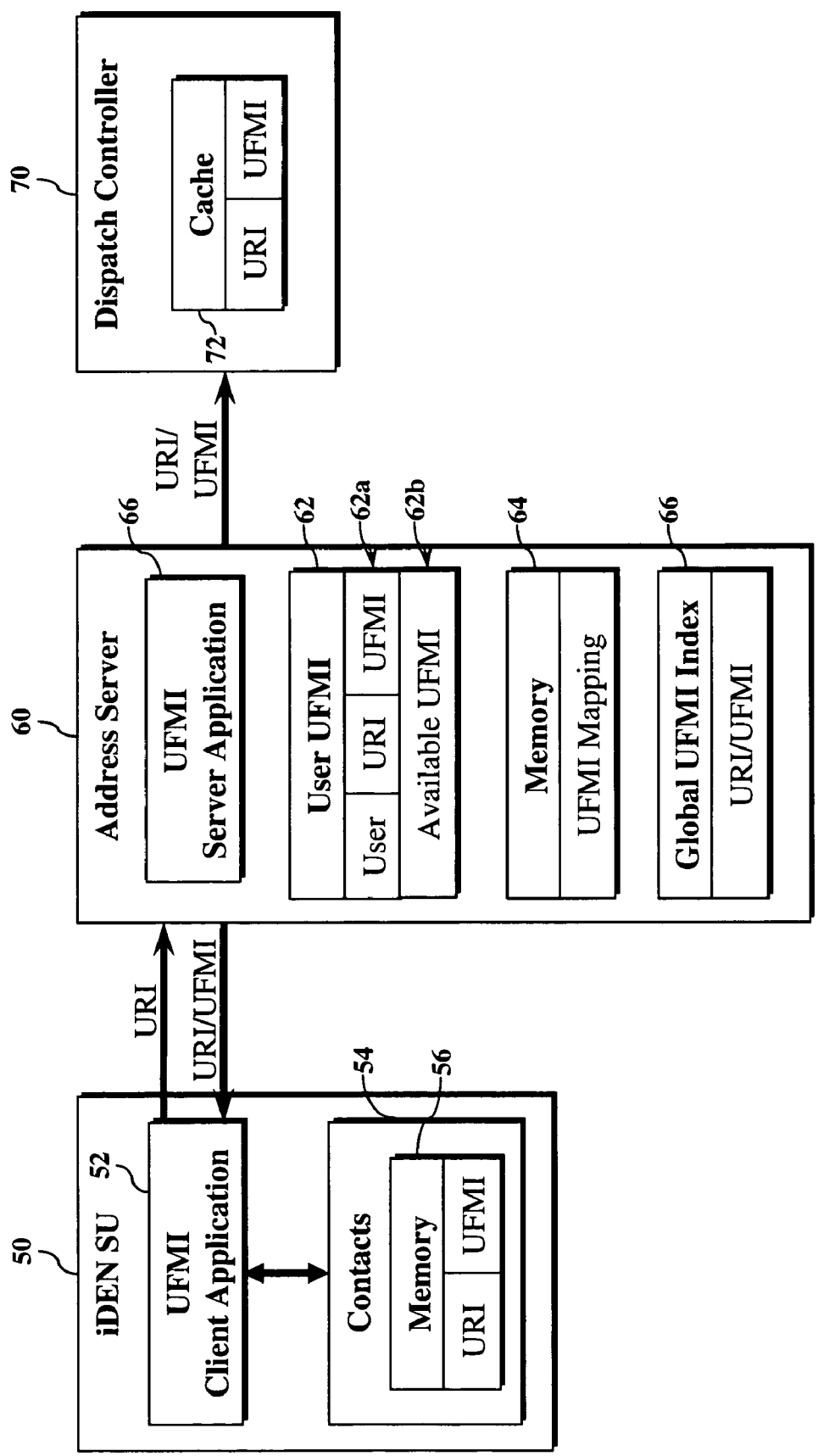
FIG. 2 illustrates an embodiment of the UFMI addressing system of the present invention.

Referring to FIG. 2, a process for mapping an external subscriber to an inter-working UFMI will be described in greater detail. When a subscriber is added to the iDEN network, the subscriber is associated with an iDEN subscriber unit (iSU) 50 and is provided access to the iDEN network in accordance with subscription properties 25 (see FIG. 1), which include a number of inter-working UFMIs that may be allocated to the subscriber. The iSU 50 includes a UFMI client application 52 and a contacts application 54, which stores a mapping of URIs and UFMIs in a memory 56.

An address server 60 on the subscriber's home network manages the allocation and mapping of the inter-working UFMIs to the subscriber unit 50 in accordance with the subscription properties. The allocation of a UFMI may be initiated by the subscriber using an application, such as the contacts application 54 on the iSU 50 which allows the subscriber to manage a list of contacts including names, phone numbers and UFMIs of other subscribers on the iDEN network. The address server 60 includes a memory 62 storing records identifying URI and UFMI mappings for each subscriber, and a memory 64 identifying available inter-working UFMIs. In one embodiment, the memory 62 stores a UFMI-URI mapping for each subscriber in the contact list. The memory 62 stores mappings for a plurality of iDEN subscribers, with each iDEN subscriber having a number of mappings that are available. A UFMI server application 66 manages the allocation and mapping of inter-working UFMIs. A dispatch controller 70 of an external network may include a cache memory 72 storing a mapping of URIs and UFMIs for subscribers on the external network.

Referring to FIG. 3, the operation of a contacts application 54 will be described with reference to FIG. 2. In step 100 the subscriber enters the contact information for another subscriber unit through the contacts application. The contacts application determines whether the entered contact dispatch address is local to the wireless network in step 102. Local contacts are saved in the memory of the subscriber unit in step 108.

If the subscriber entered dispatch information of an external subscriber unit, the contacts application automatically requests a UFMI from the address server 60 via the URI/UFMI application 52 in step 104. For example, the subscriber may enter an identifier of the subscriber unit and its domain (e.g., subscriber@nextel.com), which is forwarded to the address server 60. The interface between the subscriber unit 50 and the address server 60 may include standard protocols such as HTTP or XML. A UFMI/address mapping is received in step 106 and stored in the local memory in step 108. Alternatively, the user may enter a global UFMI that has been previously allocated to the external subscriber or identify an available reusable UFMI for the address server to assign to the external subscriber. When a reusable UFMI is entered manually by the user, there may be a conflict with a previously allocated UFMI, in which case the address server selects a new UFMI.

Referring to FIG. 4a, an operation of an address server will be described with reference to FIG. 2. In step 150, the address server 60 receives a request for an inter-working UFMI. The request may arrive from an iDEN subscriber or from an external server, and includes a dispatch address of an external subscriber unit and an iDEN user identifier. In step 152, an attempt is made to authenticate the requestor. If the requestor cannot be authenticated then an operation fail code is returned to the requestor in step 154. If the requestor is authenticated, then in step 156 the database storing global UFMI mappings is queried to determine whether a global UFMI has been previously assigned to the external subscriber. If the external subscriber has an associated global UFMI then the subscriber identifier, the global UFMI and the subscriber address information are returned to the requestor in step 168.

In step 158, the address server verifies that a reusable UFMI has not previously been allocated to the iDEN user/external user pair. If a UFMI has already been allocated, then the associated subscriber, UFMI and external address information is returned in step 168. In step 160, the address server verifies that the iDEN subscriber has available UFMI address space. If the iDEN subscriber has used all available UFMIs, then an operation fail message is returned to the requester in step 162. In one embodiment, the address server is configurable through the subscriber's client application to manage UFMI requests according to selected user preferences, including handling of UFMI requests when UFMI space has been exhausted. For example, certain UFMI's may be identified as temporary UFMIs to be allocated on a rolling first-in-first-out basis to ensure that a UFMI is always available.

If UFMI address space is available to the iDEN subscriber, then in step 164 an available reusable UFMI is allocated. In step 166 the associated data (iDEN subscriber, UFMI, external address) is stored by the address server. In step 168 the new UFMI mapping is returned to the requester. In one embodiment, the address server 60 may also transmit the UFMI mapping to an inter-working dispatch controller on the external network.

An embodiment of the allocation of global UFMIs will now be described with reference to FIG. 4b. The address server maintains a global UFMI pool for popular external subscriber units. When a reusable UFMI is assigned to an external subscriber, then in step 170, the address server determines the number of reusable inter-working UFMIs that have been mapped to the external subscriber by other users. When the number of UFMI requests for an external subscriber exceeds a predetermined threshold number, the address server allocates a single global UFMI to the external subscriber to preserve UFMIs in step 174. In step 176, each iDEN subscriber unit having a UFMI mapped to the external subscriber is notified that the reusable UFMI has been replaced by the global UFMI. In step 178, the address server releases the reusable UFMIs previously mapped to the external subscriber. The process in FIG. 4b may be executed as reusable UFMIs are assigned, as part of an administration program, or during another time as defined by the system. It is further contemplated that a global UFMIs may be converted back to reusable UFMIs if the number of global UFMI mappings falls below a second threshold number or because of a period of inactivity.

An embodiment of the allocation of a global UFMI to a client application will now be described with reference to FIG. 4c. In step 190, the subscriber unit receives a notification from the address server that a global UFMI has been assigned to an external subscriber. In step 192, the client device updates the associated mapping in the local contacts list, replacing the reusable UFMI previously assigned to the external subscriber with the global UFMI. The client application notifies the address server that the new mapping was accepted, allowing the address server to delete the previous UFMI mapping. Optionally, in step 194, the client device notifies the user of the UFMI change.

Figure 5:
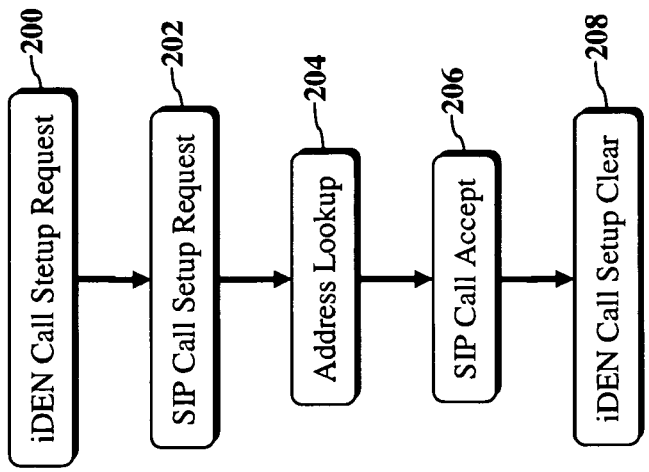
FIG. 5 illustrates an embodiment of a method for handling a dispatch call which originates in an iDEN system.

An embodiment of an iDEN originated inter-working call is illustrated in FIG. 5 and will be described with reference to FIG. 1. In step 200, an iDEN call setup request is received from the iDEN subscriber unit 12 to initiate a dispatch call with an external subscriber unit 34 on an external network. To initiate the call, the subscriber may select a target user from its contacts application and press a PTT button on the subscriber unit 12, which causes the subscriber unit 12 to transmit the dispatch request to the address server 18, including the UFMI of the external subscriber unit. The iDEN controller 16 receives the dispatch call setup request and routes the call to the iDEN gateway 20 in accordance with the destination UFMI.

In step 202, the iDEN gateway 20 transmits a call setup request to a dispatch controller 32 on the external network 30. The call setup request may include the UFMI of the source subscriber unit and the assigned UFMI of the external target unit. In the exemplary embodiment, the SIP protocol is used for communications between the iDEN Gateway 20 and the external dispatch call controller 32, though it will be appreciated that other protocols may be used.

In the exemplary embodiment, if the dispatch controller 32 cannot translate the UFMI based on the cached data, the dispatch controller 32 queries the address server 18 for the address mapping. In an alternate embodiment, address translation may be accomplished at the iDEN gateway. The query includes both the originating and terminating UFMIs, i.e., UFMI_A and UFMI_B. The address server 18 returns the mapping (UFMI_B→←user_B@nextel.com, UFMI_A→←user_A@nextel.com). The target subscriber unit associated with the target address is identified and the call request is forwarded to the eSU 34 in step 204.

The eSU 34 accepts the call in step 206 by responding with an accept message that includes a media port identifier for the dispatch session. The dispatch controller 32 translates the originating and terminating URI received from the external subscriber unit into associated UFMIs, i.e., UFMI_A@nextel.com and UFMI_B@nextel.com, and forwards the response to the iDEN gateway 20. The iDEN gateway 20 translates the SIP response into an iDEN specific response and forwards the response to the iDEN dispatch controller 16. The iDEN dispatch controller 16 forwards a call complete message to iSU 12 by granting the floor to the iSU 12. The iDEN gateway 20 completes the call and forwards its media port to the call controller. The iDEN call setup is complete in step 208. The call controller translates UFMIs into URIs and forwards the call complete message to eSU 34. The iSU 12 can then begin speaking.

Figure 6:
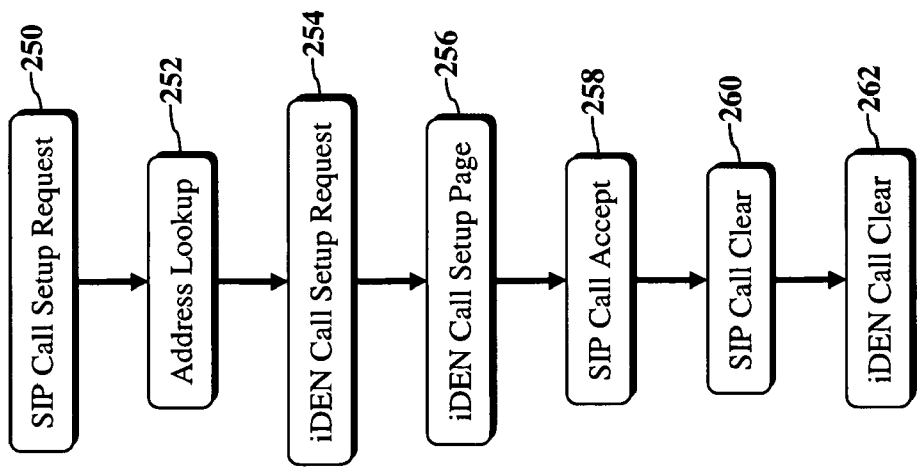
FIG. 6 illustrates an embodiment of a method for handling a dispatch call that terminates in an iDEN system.

The operation of an external subscriber unit initiated dispatch call which terminates in an iDEN system is illustrated in FIG. 6 and will be described with reference to FIG. 1. The eSU 34 initiates a call to the iDEN subscriber 12 by transmitting a SIP call setup request including the addresses of the eSU 34 (e.g., User_B@nextel.com) and iDEN subscriber unit (e.g., User_A@nextel.com or UFMI_A@nextel.com]). The SIP call setup request is received at the dispatch controller 32 from the eSU 34 in step 250. If the dispatch controller 32 does not have a cached mapping of the addresses, it queries the address server 18 for UFMI to URI mapping in step 252. If the address server does not have a UFMI allocated for the external user, a new UFMI will be randomly allocated one from the pool of available UFMIs to create a new address mapping (UFMI_Y←→User_B@xyzcorp.com). In this embodiment, the UFMIs are automatically assigned for incoming sessions. The assigned UFMIs may be automatically stored for a configurable amount of time or permanently stored as a new mapping and notification provided to the client.

An iDEN call setup request is performed in step 254, in which the dispatch controller 32 forwards the call to the iDEN Gateway 20 (From: UFMI_Y@nextel.com; To: UFMI_A@nextel.com). The iDEN Gateway 20 translates the SIP request into an iDEN specific message and forwards the message to the iDEN dispatch controller 16. The iDEN dispatch controller 16 transmits an iDEN call setup page to iSU 12 in step 256. The SIP call is accepted in step 258. The iSU 12 responds to the page and the iDEN dispatch controller 16 forwards the response to the iDEN gateway 20. The iDEN gateway 20 translates the response, allocates media resources and forwards the response and media port to the external dispatch controller 32. The external dispatch controller 32 translates UFMIs to URIs and forwards the response to eSU 34, which completes the call. The external dispatch controller 32 translates URIs to UFMIs and forwards the response to the iDEN gateway 20. The iDEN gateway 20 translates SIP to iDEN signaling and forwards to iDEN dispatch controller 16. The iDEN dispatch controller 16 forwards the call to iSU 12.

The SIP call is cleared in step 260. The iDEN call is cleared in step 262. After call completion, the iDEN user may saves the UFMI:external user mapping by performing an add operation, which is configured by the address server. The iSU 12 saves the UFMI and the name in the contact database.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. A method for facilitating dispatch communications between a first subscriber on a first network and a second subscriber on a second network, the method comprising:
   providing the first subscriber with an inter-working urban fleet member identifier (UFMI);
   providing the first subscriber with access to a set of global inter-working UFMIs;
   mapping an address of the second subscriber on the second dispatch network to the UFMI, wherein the UFMI represents an address of the second subscriber on the first network; and
   mapping the address of the second subscriber to a select one of the global UFMIs when the address of the second subscriber has been mapped by at least a predetermined number of users of the first network.

2. The method of claim 1 wherein the first subscriber is one of a plurality of subscribers on the first network, and wherein each of the plurality of subscribers is provided with a pool of inter-working UFMIs.

3. The method of claim 1 wherein the first network includes an integrated digitally enhanced network and the second network does not include any such integrated digitally enhanced network.

4. The method of claim 1 wherein the UFMI is local to at least one of the first subscriber, a fleet associated with the first subscriber, and an account associated with the first subscriber.

5. The method of claim 1 wherein the step of providing an inter-working UFMI comprises:
   establishing a subscription for the first subscriber on the first network; and
   determining a number of available UFMIs for the first subscriber in accordance with the subscription.

6. The method of claim 1 further comprising:
   receiving a dispatch call request from the first subscriber to the UFMI of the second subscriber;
   translating the UFMI of the second subscriber to the address of the second subscriber; and
   transmitting to the second network a request from the first subscriber to the address of the second subscriber.

7. The method of claim 1 further comprising:
   receiving a dispatch call request from the second network, the call request identifying the second subscriber unit as a source and the first subscriber unit as a target;
   allocating the UFMI to the first subscriber unit; and
   forwarding the received dispatch call request to the first subscriber unit, the received dispatch call request including the UFMI.

8. An address server comprising:
   a urban fleet member identifier (UFMI) server application adapted to allocate an inter-working UFMI to a subscriber unit and map the inter-working UFMI to an external subscriber address; and
   a data storage storing a cool of global UFMIs, wherein the inter-working UFMI is a global UFMI.

9. The address server of claim 8 wherein the inter-working UFMI is associated with an integrated digitally enhanced network, and wherein the external subscriber address is associated with an external network.

10. The address server of claim 9 further comprising an integrated digitally enhanced network Home Location Register (iHLR).

11. The address server of claim 8 wherein the pool of global UFMIs comprises a pool of reusable UFMIs and mapped pairs of UFMIs to external subscribers, wherein the mappings are stored on a per user basis and wherein the inter-working UFMI is a reusable UFMI from the pool.

12. The address server of clam 8 wherein the UFMI server application is further adapted to perform steps comprising:
   assigning a global UFMI to the external subscriber address when a number of reusable inter-working UFMIs mapped to the external subscriber address exceeds a predetermined threshold;
   for each subscriber unit having an associated reusable UFMI mapped to the external subscriber address, notifying the subscriber unit of the global UFMI; and
   releasing each associated reusable UFMI.

13. The address server of claim 8 wherein the UFMI server application is further adapted to perform steps comprising:
   receiving a request for the inter-working UFMI from an integrated digitally enhanced network gateway, the request including the external subscriber address and a target subscriber address;
   allocating the inter-working UFMI to the target subscriber address;
   mapping the inter-working UFMI to the external subscriber address; and
   returning the UFMI-external subscriber address mapping to the integrated digitally enhanced network gateway.

14. The address server of claim 8 wherein the UFMI server application is further adapted to perform steps comprising:
   receiving a request for the inter-working UFMI from the subscriber unit, the request including the external subscriber address;
   allocating the inter-working UFMI from a pool of inter-working UFMIs to the subscriber unit; and
   returning a mapping of the inter-working UFMI and external subscriber address to the subscriber unit.

15. The address server of claim 14 wherein the UFMI server application is further adapted to perform steps comprising:
   allocating a global UFMI to the external subscriber address if a number of mappings to the external subscriber address exceed a predetermined threshold;
   notifying the subscriber unit of the global UFMI mapping; and
   releasing reusable UFMI mappings associated with the external subscriber address.

16. A mobile device including logic for performing steps comprising:
   receiving a request to store user information associated with an external subscriber unit;
   transmitting a request for an inter-working urban fleet member identifier (UFMI) to an address server, the request including a mobile device identifier and the user information;
   receiving a UFMI:external address mapping; and
   storing the mapping on the mobile device.

17. The mobile device of claim 16 further including logic to perform steps comprising:
   receiving a request to delete stored user information, the user information having an associated inter-working UFMI;
   transmitting a deallocation message to the address server, the message including the deleted UFMI; and
   deleting the stored user information.

18. The mobile device of claim 16 further including logic to perform steps comprising receiving an update for dynamic allocation of a UFMI.

19. The mobile device of claim 18 further including logic to perform steps comprising receiving an update for allocation of a global UFMI.

20. A communications system comprising:
an address server including a data storage storing a pool of inter-working urban fleet member identifiers (UFMIs) and a memory storing program logic for instructing the address server to perform steps including:
receiving a request for an inter-working UFMI;
authenticating the request;
allocating the inter-working UFMI to a subscriber if the request is authenticated; and
mapping the allocated inter-working UFMI to an external subscriber; and
storing the mapping in the data storage.

21. The communications system of claim 20 wherein the program logic further includes instructions for causing the address server to perform steps comprising:
receiving a deallocation message identifying the subscriber and the mapped inter-working UFMI; and
returning the allocated inter-working UFMI to the pool of inter-working UFMIs.

22. The communications system of claim 20 wherein the subscriber is allocated a number of inter-working UFMIs from the pool, the number of inter-working UFMIs being based on a pricing plan associated with the subscriber.

23. The communications system of claim 20 further comprising an integrated digitally enhanced network and an external network, wherein the inter-working UFMIs are associated with the integrated digitally enhanced network, and wherein the external subscriber communicates with the subscriber through the external network.

24. The communications system of claim 23 wherein the integrated digitally enhanced network further comprises:
a gateway facilitating push-to-talk communications between the integrated digitally enhanced network and an external network;
a dispatch call controller facilitating push-to-talk communications between the subscriber and the external subscriber; and
an iHRL storing subscriber service information.

25. The communications system of claim 24 wherein the address server is adapted to:

receive a request for the inter-working UFMI from the integrated digitally enhanced network gateway;
allocate the inter-working UFMI to the target subscriber;
map the inter-working UFMI to the source address; and
return the UFMI-source address mapping to the gateway.

26. The communications system of claim 25 wherein the address server is further adapted to:
allocate a global UFMI and map the global UFMI to the source address when the number mappings associated with the source address exceeds a predetermined threshold.

27. The communications system of claim 24 wherein the gateway is adapted to:
receive a dispatch call request from the external network, the dispatch call request including a target address of the subscriber on the integrated digitally enhanced network, and a source address of the external subscriber on the external network; and
request the inter-working UFMI from the address server.

28. The communications system of claim 27 wherein the gateway is further adapted to:
receive the UFMI-source address mapping from the address server; and
prepare an integrated digitally enhanced network dispatch call setup request message including the UFMI of the subscriber and the inter-working UFMI of the external subscriber; and
forward the integrated digitally enhanced network dispatch call setup request to the subscriber.

29. The communications system of claim 27 wherein the gateway is adapted to:
receive a dispatch call request from the subscriber, the dispatch call request including the inter-working UFMI for the external subscriber on the external network;
retrieve an external address associated with the inter-working UFMI; and
transmit an inter-working call request to the external network, the inter-working call request including a network address of the subscriber and the external address of the target subscriber.

30. The communications system of claim 29 wherein the gateway is further adapted to cache the received mapping.

* * * * *